Dec. 17, 1929.     J. P. SHANNON     1,740,273
FISHING LURE
Filed April 20, 1929

Inventor,
Jesse P. Shannon

Patented Dec. 17, 1929

1,740,273

UNITED STATES PATENT OFFICE

JESSE P. SHANNON, OF LAKE GENEVA, WISCONSIN

FISHING LURE

Application filed April 20, 1929. Serial No. 356,674.

This invention relates to improvements in fishing lures and more particularly to artificial bait equipped with metal "spinners" which rotate as the lure is drawn through the water.

Bait or lures fitting this description may be of various kinds and sizes depending on the particular style of fishing for which they are designed, so that it is necessary to confine the disclosure to a more or less definite type, such as the feathered hook or weighted fly, used extensively in bait casting. Lures of this type generally consist of a single hook concealed by feathers and having the spinner so attached as to spin near the hook.

To make such lures more attractive, it is customary to dress them by adding a strip of pork rind, which when drawn through the water resembles the movement of a minnow or other small fish. The pork rind is usually attached directly to the hook, or to the shank thereof, and in some cases a special rig or harness has been provided. So far as I am aware, however, no means has been provided for attaching a pork rind strip to the "spinner", or other equivalent part of a lure.

The object of the present invention is, therefore, to provide an improved lure, embodying the attachment of a pork rind strip or its equivalent to a rotative spinner, or like part, which is actuated by the travel of the lure through the water but with a movement quite independent thereof.

Figure 1:
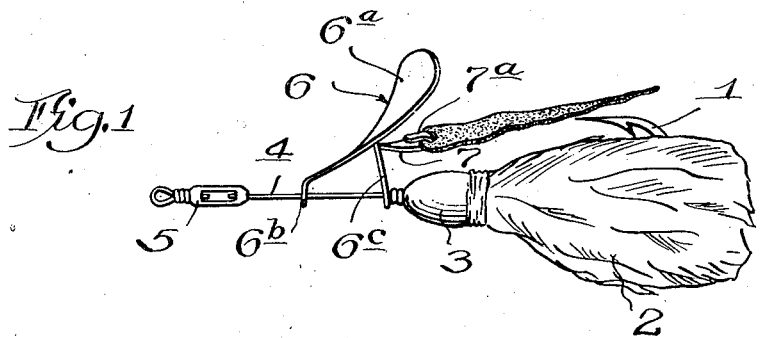
Figure 1 is a perspective view of a feathered lure having a spinner mounted to rotate on the extended shank thereof, with provision for attaching a pork rind strip.
Figure 2:
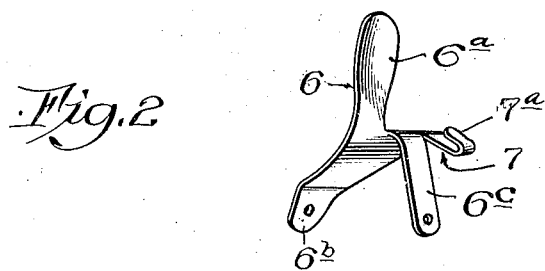
Figure 2 is a perspective view of the spinner removed.

The lure illustrated in Figure 1 consists of a barbed hook 1, partially, if not entirely, concealed in a sheath 2 of feathers secured at the shank end of the hook where is also mounted a conical shaped weight 3. Extending beyond the weight 3 is a bare stiff wire 4 forming an extension of the shank of the hook 1 and terminating in a swivel eyelet 5 for attachment to the end of a line. Mounted for free rotation on the wire 4 is a spinner 6, consisting of a metal spoon-shaped blade $6^a$ rounded at its outer end and tapering toward its inner to form a bearing $6^b$ through which the wire passes. Midway of its length, an arm $6^c$ is struck from the blade and bent at right angles thereto, this arm having a hole at its ends through which the wire also passes, thus providing a two point bearing for the spinner, which rotates in a fixed path about the wire, maintaining a constant position relative to its axis of rotation, at the same time being free to slide along the wire in both directions.

At one side of the blade and adjacent the base of the bearing arm $6^c$ is another arm 7 bent to assume a position parallel to the wire 4, and having its end bent to form a hook $7^a$. To this arm is attached a strip of pork rind 8 or other suitable material, having a slit at one end for convenience in attaching. The strip 8 thus attached to the spinner, rotates with it as the lure is drawn through the water, with a combined wriggling motion.

Figure 3:
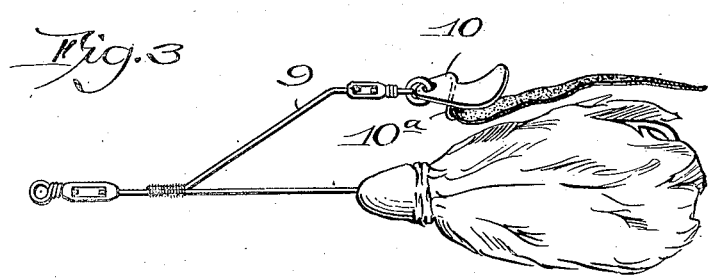
Figure 3 is a perspective view of another type of lure having a separate arm for the attachment of the spinner and the rind attached thereto.

The arrangement or rig shown in Figure 3 is similar to that of Figure 1 except that the spinner is attached to the lure by separate wire 9 fixed at one end at the swivel end of the wire 4, and bent outwardly at an angle of about 30°. The spinner 10 has a single swivel connection with the free end of the wire 9 and is provided with an arm $10^a$ with a hooked end, for the attachment of a strip, as before. In this form, the arm however is bent to extend at right angles to the direction of movement of travel of the lure so that it will traverse a circular path as the spinner revolves, instead of merely revolving with the spinner as it trails behind it.

The foregoing are but two types or rigs illustrative of the attachment of a pork rind strip to the spinner of an artificial bait or lure. Manifestly, many other combinations may be devised, and therefore my invention is not limited to feathered hooks and spinners, but broadly to all types of artificial bait in which means are provided for attaching a pork rind strip or its equivalent to some part of the lure other than a hook, which has a rotative, oscillating or wriggling motion relative to the body of the lure as it travels through the water.

I claim as my invention:

1. A fishing lure comprising a body portion including a hook, a rotative member attached to said body portion and adapted for movement relative thereto in the travel of said lure through the water, and means for attaching a strip of pliable material to said member.

2. A fishing lure comprising a body portion including a hook, a metallic plate attached to said body portion and having a predetermined movement relative to said body portion as the lure travels through the water, said plate having a hooked portion for the attachment of a strip of pliable material.

3. A fishing lure comprising a hook bearing portion adapted to be attached to a line, a spinner attached to said bearing portion, and a strip of pliable material detachably connected with said spinner and movable therewith in the travel of said lure through the water.

4. A fishing lure comprising a hook bearing portion having a bare wire adapted to be attached to a line, a spinner mounted on said wire and adapted to rotate in the travel of said lure through the water, said spinner having a hook for the attachment of a strip of pork rind.

5. A fishing lure comprising a hook bearing portion having a bare wire adapted to be attached to a line, a spinner mounted on said wire and adapted to rotate in the travel of said lure through the water, said spinner having an arm struck therefrom and provided with a hooked extremity for the attachment of a strip of pork rind.

Signed at Lake Geneva, Wis., this 16th day of April, 1929.

JESSE P. SHANNON.